(12) United States Patent
Farr et al.

(10) Patent No.: US 9,294,201 B2
(45) Date of Patent: *Mar. 22, 2016

(54) OPTICAL COMMUNICATION SYSTEMS AND METHODS

(71) Applicant: Woods Hole Oceanographic Institution, Woods Hole, MA (US)

(72) Inventors: Norman E. Farr, Woods Hole, MA (US); Lee Freitag, Falmouth, MA (US); James Preisig, Falmouth, MA (US); Dana Yoerger, North Falmouth, MA (US); Sheri N. White, East Falmouth, MA (US); Alan D. Chave, Falmouth, MA (US)

(73) Assignee: WOODS HOLE OCEANOGRAPHIC INSTITUTION, Woods Hole, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/710,456

(22) Filed: May 12, 2015

(65) Prior Publication Data

US 2015/0372769 A1    Dec. 24, 2015

Related U.S. Application Data

(63) Continuation-in-part of application No. 14/557,361, filed on Dec. 1, 2014, now Pat. No. 9,231,708, which is a continuation-in-part of application No. 13/117,867, filed on May 27, 2011, now abandoned, which is a continuation of application No. 11/348,726, filed on Feb. 6, 2006, now Pat. No. 7,953,326, said application No. 14/557,361 is a continuation-in-part of application No. 13/344,430, filed on Jan. 5, 2012, now Pat. No. 8,953,944.

(60) Provisional application No. 61/430,081, filed on Jan. 5, 2011.

(51) Int. Cl.
| H04B 10/00 | (2013.01) |
|---|---|
| H04B 10/80 | (2013.01) |
| H04B 13/02 | (2006.01) |
| H04J 14/00 | (2006.01) |

(52) U.S. Cl.
CPC .............. H04B 10/80 (2013.01); H04B 13/02 (2013.01); *Y10T 29/49826* (2015.01)

(58) Field of Classification Search
CPC .. H04B 10/11; H04B 10/114; H04B 10/1143; H04B 10/116; H04B 10/80
See application file for complete search history.

(56) References Cited

U.S. PATENT DOCUMENTS 5,894,450 A * 4/1999 Schmidt ................. H04B 13/02
                                                                                             367/131
6,071,302 A    6/2000 Sinofsky et al.
(Continued)

OTHER PUBLICATIONS

Bradner, Hugh "Seismic Measurements on the Ocean Bottom", Science, Oct. 9, 1964, pp. 208-216, vol. 146 No. 3641, AAAS.

*Primary Examiner* — Daniel Dobson
(74) *Attorney, Agent, or Firm* — Douglas Denninger

(57) ABSTRACT

An underwater system including at least one input device that is in sensory communication with water and generates input signals. The system further includes at least one optical transmitter and at least one optical receiver that allow omni-directional transmission and reception through water of optical signals representing the input signals, and allow data rates greater than 1 Mbps.

11 Claims, 11 Drawing Sheets

(56) References Cited

U.S. PATENT DOCUMENTS

| | | |
|---|---|---|
| 7,016,260 B2 | 3/2006 | Barry |
| 7,046,160 B2 | 5/2006 | Pederson et al. |
| 7,124,028 B2 | 10/2006 | Ray et al. |
| 7,439,847 B2 | 10/2008 | Pederson |
| 7,646,670 B2 | 1/2010 | Maxwell et al. |
| 7,711,322 B2 | 5/2010 | Rhodes et al. |
| 7,835,221 B2 | 11/2010 | Vigen et al. |
| 7,953,326 B2 * | 5/2011 | Farr ............ H04B 13/02 398/104 |
| 7,957,222 B2 | 6/2011 | Souders et al. |
| 8,014,677 B2 | 9/2011 | Golparian |
| 8,019,549 B2 | 9/2011 | Haque et al. |
| 8,233,801 B2 | 7/2012 | Sexton et al. |
| 8,682,159 B2 | 3/2014 | Kovsh et al. |
| 8,964,500 B2 | 2/2015 | Souders et al. |
| 2005/0232638 A1 | 10/2005 | Fucile et al. |
| 2006/0008275 A1 | 1/2006 | Lacovara et al. |
| 2008/0310850 A1 | 12/2008 | Pederson et al. |
| 2010/0054748 A1 | 3/2010 | Sato |
| 2014/0198607 A1 | 7/2014 | Etienne et al. |
| 2014/0341584 A1 | 11/2014 | Hopewell et al. |
| 2014/0363166 A1 | 12/2014 | Lacovara |
| 2015/0109883 A1 | 4/2015 | Vangasse et al. |

* cited by examiner

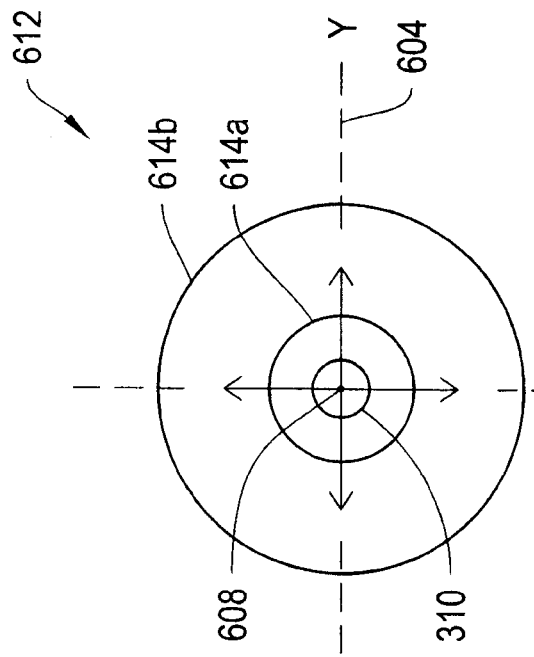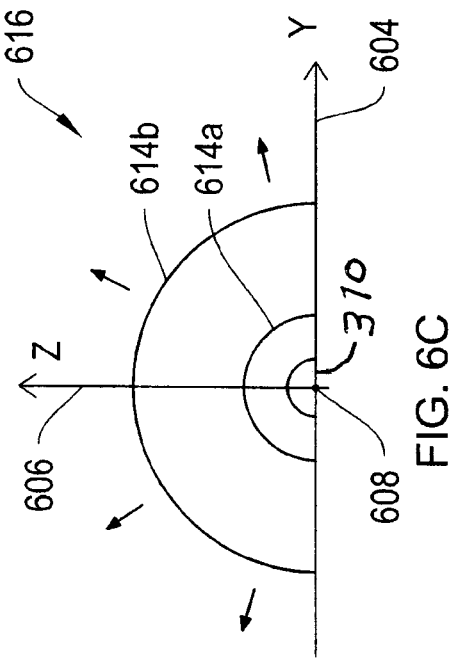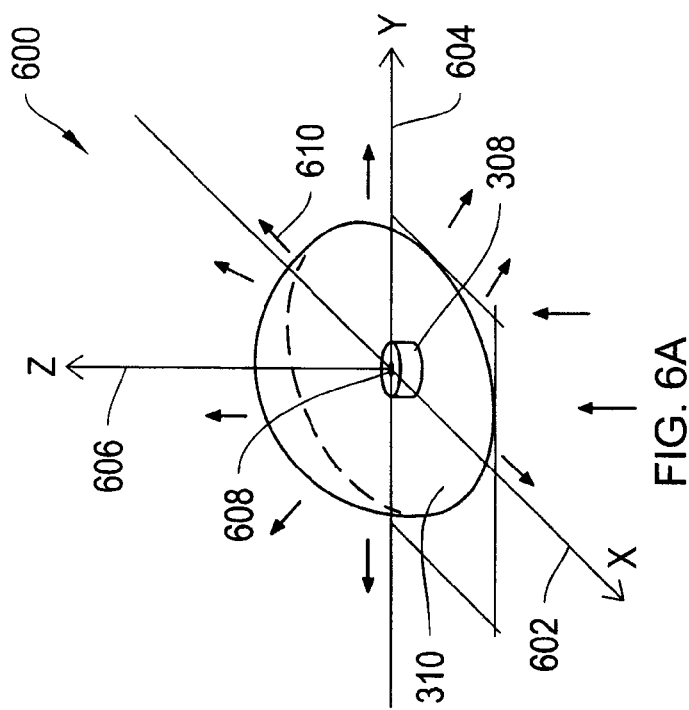

OPTICAL COMMUNICATION SYSTEMS AND METHODS

CROSS-REFERENCE TO RELATED APPLICATIONS

This application is a continuation-in-part of U.S. application Ser. No. 14/557,361 filed 1 Dec. 2014, which is a continuation-in-part of: (i) U.S. application Ser. No. 13/117,867 filed 27 May 2011, which is a continuation of U.S. application Ser. No. 11/348,726 filed 6 Feb. 2006, now U.S. Pat. No. 7,953,326; and (ii) U.S. application Ser. No. 13/344,430 filed 5 Jan. 2012, now U.S. Pat. No. 8,953,944; and claims priority to U.S. Provisional Application No. 61/430,081 filed 5 Jan. 2011. The entire contents of each of the above-mentioned applications are incorporated herein by reference.

FIELD OF THE INVENTION

This invention relates to systems and methods that transmit optical signals among a plurality of nodes within one or more amorphous broadcast media.

BACKGROUND OF THE INVENTION

Sensor-bearing unmanned underwater vehicles (UUV), as well as cabled ocean observatories, have been deployed extensively to study both natural and man-made phenomena including oceanic processes. Certain types of UUVs are tethered by cable to seafloor observatories or to surface ships. The tethered UUVs have a short range of motion and are limited by the length of the tether. Most wireless communication necessary for un-tethered UUVs is accomplished by acoustic communication systems. Such acoustic communication systems, however, are limited by low band-width and high latency, and do not permit video or other high-rate data transfers. Accordingly, improved underwater optical communication (opticom) systems have been developed such as those described by Fucile et al. in US Patent Publication No. 2005/0232638 and by Farr et al. in U.S. Pat. No. 7,953,326, the latter being incorporated herein by reference.

Opticom uses light instead of sound to carry information. An opticom system encodes a message into an optical signal, and then emits or transmits the optical signal from one communication node through a transmission medium to a receiver at another communication node, which reproduces the message from the received optical signal. The term "communication node" as used herein includes movable opticom systems carried by non-stationary, mobile objects such as a surface ship or a UUV, and non-movable opticom systems at a stationary position such as within an underwater observatory. Advantages of opticom systems are identified for example in a News Release by Woods Hole Oceanographic Institution titled "Optical system promises to revolutionize undersea communications", published Feb. 23, 2010.

Accordingly, there is a need for an improved communication system that allows high-bandwidth, bidirectional wireless communication among two or more nodes in at least one amorphous medium.

SUMMARY OF THE INVENTION

An object of the present invention is to improve optical communication among a plurality of communication nodes in at least one amorphous medium of a gas such as air, of a liquid such as water, and/or a vacuum.

Another object of certain aspects of the present invention is to improve reception of a transmitted optical signal reaching a detector or receiver immersed in the amorphous medium.

This invention features a system that broadcasts an optical signal from a transmitter through an amorphous medium to a detector, also referred to as a receiver. In one aspect, the transmitter and receiver are physically separated from each other and can send and receive electromagnetic radiation in the optical spectrum. The transmitter includes a diffuser to diffuse the optical radiation along many different directions to allow omni-directional transmission. The receiver includes a substantially hemispherical surface to receive optical radiation from a plurality of different directions to allow omni-directional reception. The system further includes an input device, such as a temperature sensor, a pressure sensor, a motion sensor such as an acoustic sensor and/or a seismic motion sensor, a light sensor, and/or a video camera, that is capable of being in sensory communication with the amorphous medium and is capable of generating input signals. The transmitter receives the input signals from the input device and then converts the input signals into the optical signal.

More particularly, in one aspect, the systems and methods described herein include underwater communication systems, each system including a transmitter having a source capable of emitting electromagnetic radiation, and a diffuser capable of diffusing the electromagnetic radiation. The diffuser is disposed in a position surrounding a portion of the source for diffusing the electromagnetic radiation in a plurality of directions. In some embodiments, the underwater communication system also includes a receiver having a detector capable of detecting electromagnetic radiation, such that the electromagnetic radiation can be received in substantially any direction. In certain embodiments, the electromagnetic radiation includes electromagnetic waves of wavelength in the optical spectrum between 300 nm and 800 nm.

In certain embodiments, the transmitter includes a plurality of sources and, in some embodiments, the sources are individually controllable. In a number of embodiments, the transmitter includes an electronic circuit to drive at least one of the sources. In one embodiment, the electronic circuit includes at least one of an emitter coupled logic design, a cascade configured design, and a totem pole-type design. In some embodiments, the electronic circuit includes at least one of a field effect transistor and a bipolar device. In one embodiment, the transmitter includes an etalon to modulate the electromagnetic radiation from at least one source. In certain embodiments, the transmitter converts the input signals to a format that is usable to transmit the information contained in the input signals as the optical signal through the amorphous medium.

In some embodiments, the receiver includes a detector and a diffuser capable of diffusing the electromagnetic radiation and disposed in a position surrounding a portion of the detector. In one embodiment, the receiver is capable of receiving the electromagnetic radiation along a radius of a hemispherical region. In certain embodiments, the receiver includes an electronic circuit with an automatic gain control circuit to prevent the saturation of the detector.

In a number of embodiments, the diffuser is formed from at least one of a discrete reflective element, a discrete refractive element and a high transmission scattering medium. The diffuser is integrally formed with the detector in some embodiments and, additionally and optionally, is integrally formed with the source. The diffuser may also be disposed on top of the source. In another embodiment, the diffuser is capable of diffusing the electromagnetic radiation in a plurality of directions along a radius of a hemispherical region. The diffuser is formed from at least one of silicone and titanium dioxide (TiO$_2$) in some embodiments. In certain embodiments, the source includes at least one of a light emitting diode, a laser diode and a photodiode, which is embedded in the diffuser in one embodiment. The detector is a photomultiplier tube including a large-aperture, hemispherical photomultiplier tube in one embodiment.

In other aspects, the invention provides for an underwater communication system that includes multiple nodes physically separated from each other and having transmitters and receivers that are configured for high-bandwidth, high-range and omni-directional communication between the nodes. Each node includes a transmitter having a source capable of emitting electromagnetic radiation, and a diffuser capable of diffusing the electromagnetic radiation. At least one node includes a transmitter having a source capable of emitting electromagnetic radiation representative of input signals of at least one input device in sensory communication with the water. In some embodiments, each node also includes a receiver having a detector capable of detecting electromagnetic radiation, such that the electromagnetic radiation can be received in substantially any direction. In certain embodiments, the electromagnetic radiation includes electromagnetic waves of wavelength in the optical spectrum between 300 nm and 800 nm. In one embodiment, the power of transmission of the electromagnetic radiation is kept fairly constant over time. In some embodiments, each of the two or more nodes transmits and receives the electromagnetic radiation at a rate of at least 1 Mbps. In a number of embodiments, at least one of the nodes includes a mobile unit and, in certain embodiments, at least one of the nodes includes a stationary unit.

BRIEF DESCRIPTION OF THE DRAWINGS

In what follows, preferred embodiments of the invention are explained in more detail with reference to the drawings, in which:

FIGS. 6A-6C are charts depicting the direction of propagation of electromagnetic radiation from a transmitter according to the invention;

DETAILED DESCRIPTION OF THE PRESENTLY PREFERRED EMBODIMENTS

This invention may be accomplished by a system and method that broadcasts an optical signal from a transmitter through an amorphous medium such as air, water or a vacuum to a receiver, which typically includes a detector that is responsive to at least the wavelength of the optical signal. In one aspect, the transmitter and receiver are physically separated from each other and can send and receive electromagnetic radiation in the optical spectrum. The transmitter includes a diffuser to diffuse the optical radiation along many different directions to allow omni-directional transmission. The receiver includes a substantially hemispherical surface to receive optical radiation from a plurality of different directions to allow omni-directional reception. The system further includes an input device, such as a temperature sensor, a pressure sensor, a motion sensor such as an acoustic sensor and/or a seismic motion sensor, a light sensor, and/or a video camera, that capable of being in sensory communication with the amorphous medium and generating input signals. The transmitter receives the input signals from the input device and then converts the input signals into the optical signal.

Figure 1:
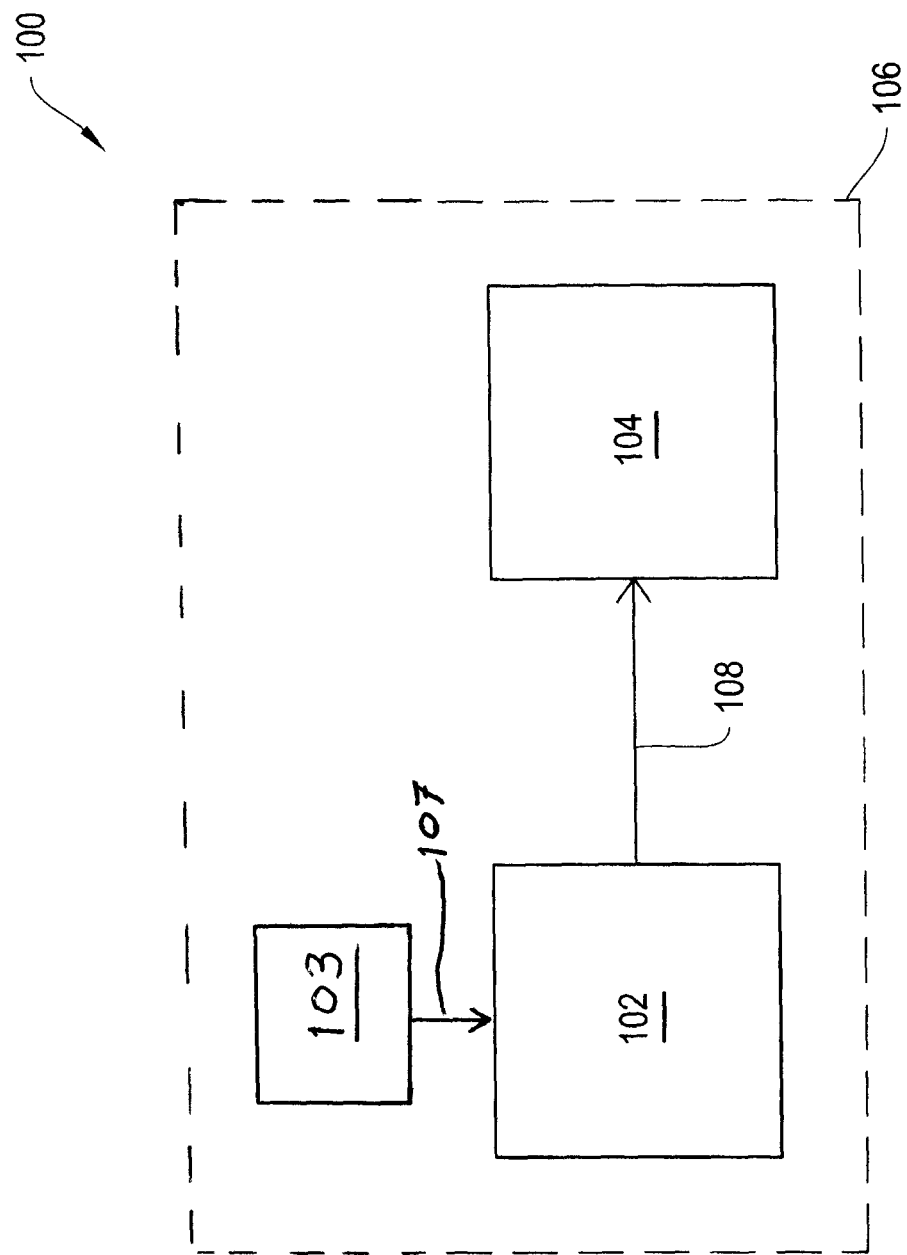
FIG. 1 is a schematic block diagram of an optical communication system according to the invention immersed in an amorphous medium.

FIG. 1 depicts a high-level block diagram of an optical communication system 100 according to the present invention including a transmitter 102, at least one input device 103, and a receiver 104. The transmitter 102 and the receiver 104 are shown to be physically separated from each other in an amorphous communication medium 106, illustrated by dashed lines surrounding transmitter 102, input device 103 and receiver 104. Arrow 107 indicates input signals communicated wirelessly from input device 103 to transmitter 102 in some constructions and, in other constructions, communicated through an electrical cable, fiber optics, or other communication channel connecting input device 103 with transmitter 102. Arrow 108 indicates the direction of information flow from the transmitter 102 to the receiver 104 via optical signals.

Transmitter 102 includes electronic and optical components to prepare and then wirelessly transmit an input signal across the communication medium 106. To prepare an input signal for transmission, the transmitter 102 receives input signals from input device 103 and then converts the format of the input signal to a format that can be used to transmit the information contained in the input signal through the communication medium 106.

In some constructions, the transmitter 102 is configured to receive input signals from different types of input devices 103, or from multiple sensors associated with a single input device 103. In some such constructions, the one or more input devices 103 include data elements such as a temperature sensor, a pressure sensor, a motion sensor such as an acoustic sensor or a seismic sensor, a light sensor, and/or a video camera. In certain constructions, the input devices include one or more control elements such as a keyboard, a touch screen, a touch pad or track-ball, a mouse, a joystick, a keypad and/or a computer program. In certain constructions, the transmitter 102 is configured to convert the format of the input signals obtained from both data elements as well as control elements to a format that is better suited for transmitting the information contained in the input signal over a particular communication medium 106. As an example, if the communication medium 106 is water, then the format of the input signal may be converted to a format that the transmitter may be able to send on electromagnetic waves in the optical spectrum. Further details for wireless transmission in one construction utilizing an oscillator to generate a carrier wave are described in more detail below in relation to FIG. 3.

In some constructions, receiver 104 includes electronic and electrical components to receive and process a modulated carrier wave containing information from the input signal from a transmitter 102 across a communication medium 106. To receive a modulate carrier wave, the receiver 104 includes a directional element to control the direction from which the information is received and a detector, such as a photomultiplier tube, to detect a characteristic of the modulated carrier wave. Directional element include a diffuser in some constructions to receive the modulated carrier waves from a plurality of directions. The directional element may include tracking elements such as acoustic sensors such that the modulated carrier wave is received from a particular direction. Further details for one construction of a suitable receiver is described in more detail below in relation to FIG. 4.

Arrow 108 shows a flow of information from the transmitter 102 to the receiver 104. While arrow 108 depicts the direction of information flow, it does not necessarily restrict the direction of propagation of the modulated carrier wave to any special direction, or to any particular receiver. The direction of propagation of the modulated carrier wave is typically controlled by the directional elements in the transmitter 102 and the receiver 104, as described in more detail below.

Figure 2:
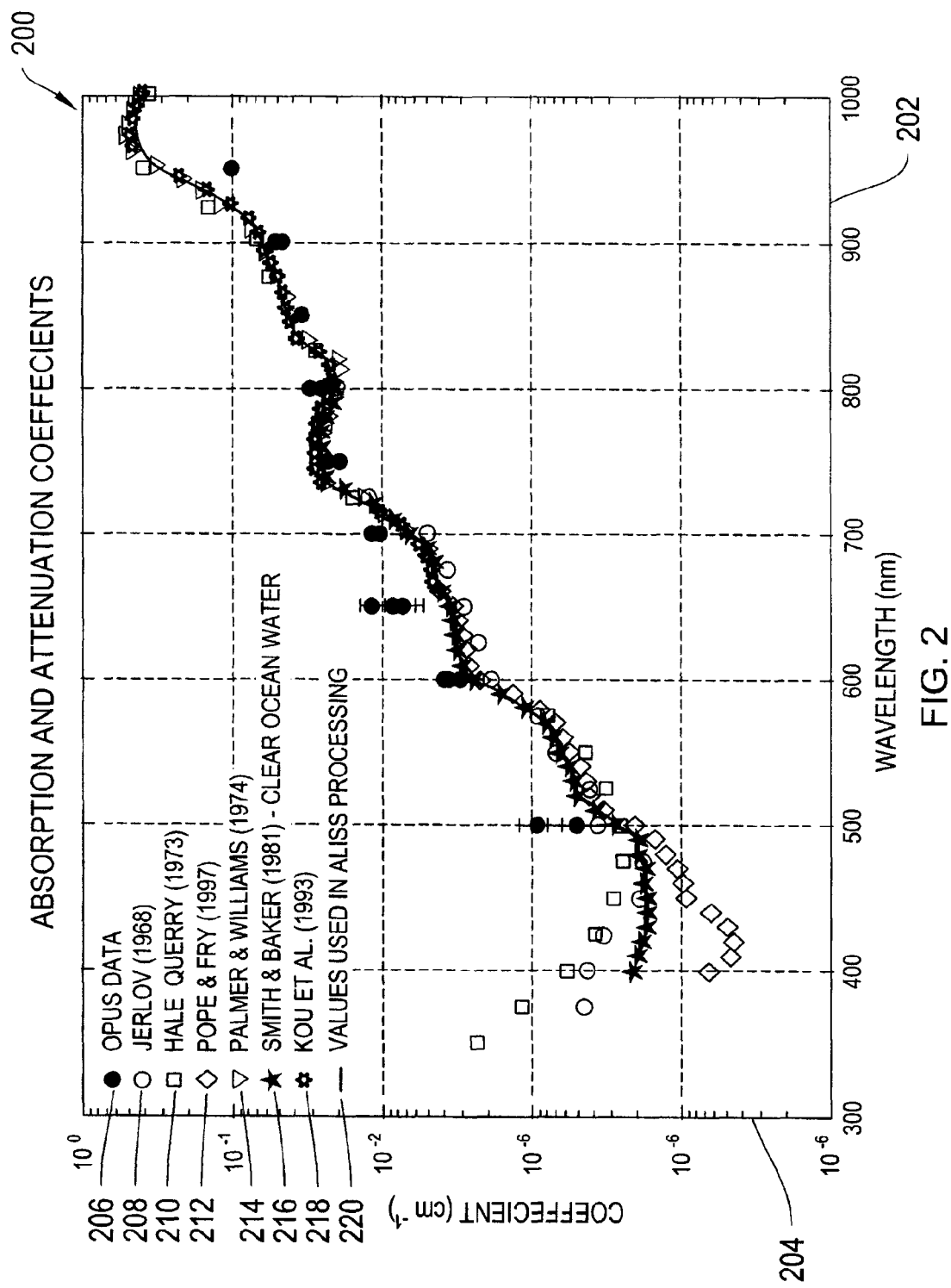
FIG. 2 is a graph depicting the relationship between attenuation coefficient of electromagnetic radiation and wavelength of the electromagnetic radiation in water and seawater.

Graph 200, FIG. 2, depicts the relationship between the coefficient of attenuation of electromagnetic radiation in water and the wavelength of the electromagnetic radiation. The horizontal axis 202 represents the wavelength of the electromagnetic radiation in nm ($10^{-9}$ m). The vertical axis 204 represents the attenuation coefficient in $cm^{-1}$ shown in logarithmic scale. The date points for plots 206-220 show experimental results for attenuation coefficients at certain wavelengths.

More particularly, graph 200 shows the attenuation coefficient of electromagnetic radiation in clear water as well as sea water. Since data points corresponding to water and sea water plots 206-220 in graph 200 can be approximated by a straight line and since the vertical axis is in logarithmic scale, the relationship between the attenuation coefficient of electromagnetic radiation and wavelength is roughly exponential. Graph 200 further shows that seawater is generally opaque to electromagnetic radiation except over the optical spectrum. In other words, electromagnetic waves of wavelength in the optical spectrum between 300 nm and 800 nm are particularly suitable for use according to the present invention.

Light wave lengths between 400 and 500 nm pass through water with less attenuation than most other wavelengths and will generally be present in the emitted light. Most of the constituent wavelengths, when white light is passed through a long water path length, are more rapidly attenuated by the water than wavelengths in the 400 to 500 nm range. Therefore for the greatest optical telemetry range (e.g. 100 m-200 m), it is most efficient to use light comprising wavelengths in the 400-500 nm "window". For color imaging, which takes place at much shorter ranges (10 m), white light is required.

Effective transmission of optical data between the inventive emitters and detectors will vary in distance and rate depending on water clarity. In substantially clean water, the inventive emitter/detector systems will transmit up to 110 meters at data rates of 2, 5, 8, 10, or 12 megabits/second. To achieve transmission distances of 200 meters in clean water transmission rates of less than 2, 1.5, 1.0, 0.75, or 0.5 Mbps will be needed.

Figure 3:
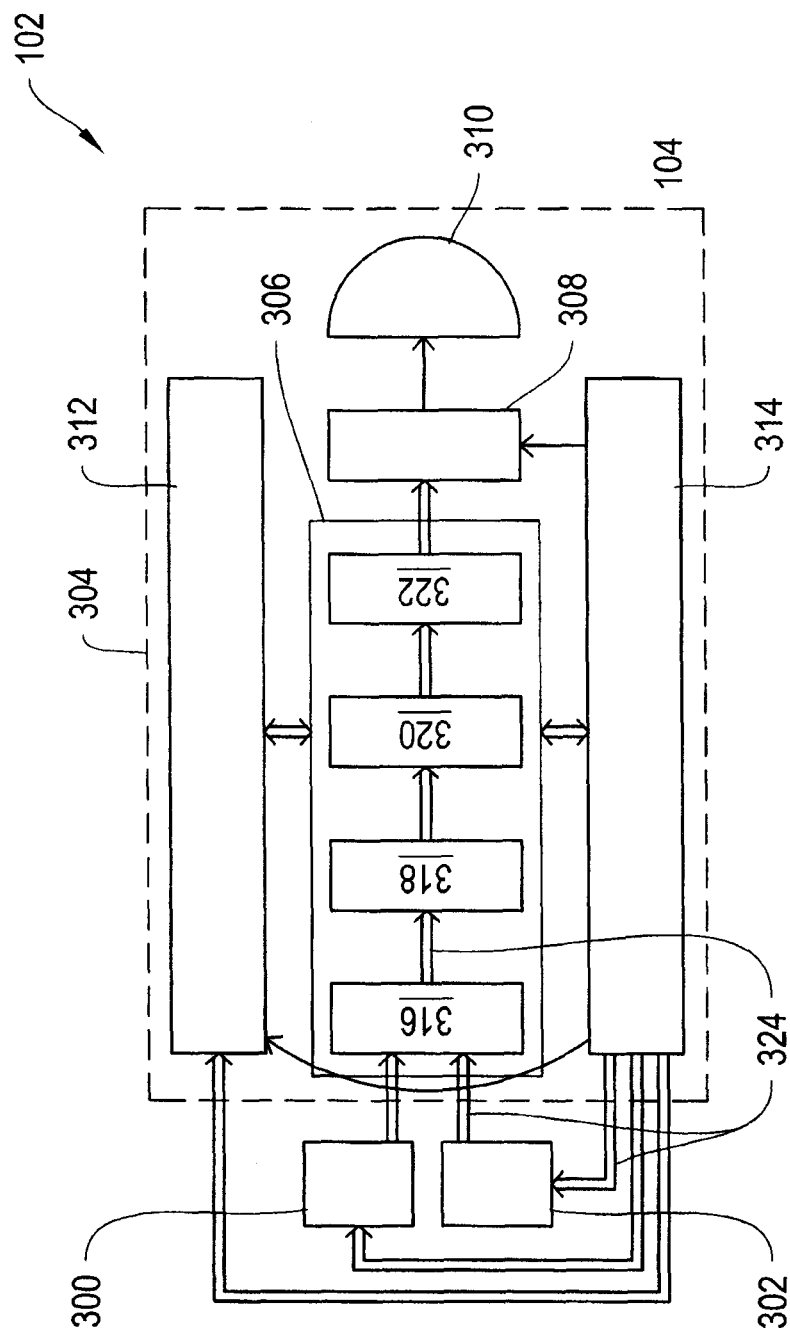
FIG. 3 is a more detailed block diagram of a transmitter according to one embodiment of the invention.

FIG. 3 is a more detailed block diagram of a primary emitter 102 according to one embodiment of the invention connected to input devices including a data element 300 and a control element 302, which provide an input signal containing information to be transmitted. The primary emitter 102, also referred to as transmitter 102, receives input signals from an input device and then converts the format of the input signal to a format that can be used to transmit the information contained in the input signal through seawater or other communication medium. In one embodiment, the primary emitter 102 is configured to receive input signals from different types of input devices. In such an embodiment, the input devices may include data elements such as sensors including a temperature sensor, a pressure sensor, a motion sensor such as an acoustic sensor and/or a seismic motion sensor, a light sensor, and/or a video camera. The primary emitter 102 includes a water-proof enclosure 304 that houses a microprocessor 306, an oscillator 308, a directional element 310, a memory 312 and a power supply 314. The microprocessor 306 includes a data interface module 316, a protocol/buffer module 318, a coding module 320 and a modulating module 322. Elements are electrically connected to each other by interconnect bus 324.

Data element 300 includes sensors that typically acquire information from the surrounding environment such as temperature, pressure, gaseous composition, vibrations or other motion, and/or visual appearance. In one embodiment, a data element 300 includes at least one of a temperature sensor, a moisture sensor, a pressure sensor, a gas sensor, a light sensor, a motion sensor such as an acoustic sensor and/or a seismic sensor, and a video camera. In another embodiment, the data element 300 may include a laser induced breakdown spectrometer, Raman spectrometer or mass spectrometer. The data element 300 may include other devices that collect information from the surrounding environment, for example at least one type of electromagnetic emission, such as optical radiation or narrow-band EM field, and/or at least one type of mechanical wave emission, such as ground-coupled vibration, sonic, ultrasonic, or low-frequency (infrasonic) acoustic emissions, for marine-based and/or terrestrial alternate-energy sources or other installations or human activity.

The data element 300 typically generates a data signal that contains information sensed from the surrounding environment. The data signal generated by the data element may include electrical DC or AC signals having characteristics representative of the information collected. For example, the amplitude of a DC electrical signal may be representative of the temperature of the surrounding environment. In one construction, input signals are obtained from MEMS (Micro-Electro-Mechanical Systems) accelerometers to sense ground motions or other vibrations such as described by Cochran et al. In "A Novel Strong-Motion Seismic Network for Community Participation in Earthquake Monitoring, IEEE Instrumentation & Measurement Magazine, December 2009, pages 8-15. Other suitable input devices for sensing at least one ocean parameter are disclosed in U.S. Pat. No. 5,894,450 by Schmidt et al., U.S. Pat. No. 7,016,260 by Bary, and U.S. Pat. No. 7,711,322 by Rhodes et al., for example.

Suitable primary emitters can be any device capable of producing a signal to be transmitted through the broadcast medium to a detector. In preferred embodiments, the primary emitter is an LED or array of LEDs. In the most preferred embodiments the primary emitter emits light in the visible range, preferably encompassing wavelengths within the blue color range. The light may be a mixture of wavelengths such as white light or it may be monochromatic. The characteristics of the optical signal to be transmitted through the broadcast medium to the detector, including the use of electromagnetic carrier waves, on-off keying ("OOK") and pulse-position modulation ("PPM"), are known to skilled practitioners and are exemplified by Farr et al. in U.S. Pat. No. 7,953,326, incorporated herein by reference.

Suitable emitters should be capable of rise and fall times of less than 1 microsecond, preferably less than 50 nanoseconds, more preferably less than 1 nanosecond, and ideally less than 10-100 picoseconds. Current LEDs operate in the greater than 100 picosecond range; to achieve rates of less than 100 picoseconds, laser-based emitters will generally be employed.

The directional element 310 includes elements that are used to control the direction of propagation of the modulated carrier waves. Each wave may propagate in a different direction and the orientation of the modulated carrier waves as they propagate in the communication medium 106 may be visualized as a two- or three-dimensional wavefront. A wavefront can be described as a two- or three-dimensional surface through which the modulated carrier waves pass such that the phase of all or substantially all waves at any point on a given surface may be the same. As an example, a wavefront may be a plane that corresponds to waves that are parallel to each other, i.e., a collimated beam.

In one embodiment, the directional element 310 includes a diffuser. Diffusers are configured to diffuse the modulated carrier waves in a plurality of different directions. In certain embodiments the diffuser includes at least one of a discrete reflective element, a discrete refractive element, and a high transmission scattering medium. Discrete reflective elements such as parabolic mirrors may reflect light in a plurality of different directions. Discrete refractive elements such as curved lenses may refract light in a plurality of different directions. High transmission scattering mediums such as transmission gratings have uneven surfaces so that they may scatter light in a plurality of directions. Diffusers may be configured to diffuse modulated carrier waves such that the modulated carrier waves describe a hemispherical wavefront. Diffusers may also be configured to diffuse modulated carrier waves such that the modulated carrier waves describe a cylindrical wavefront. Hemispherical diffusers typically have a wide field of view because the modulate carrier waves propagate in all directions along the radius of a hemisphere with the oscillator 308 located in the center. Diffusers include a mixture of $TiO_2$ and silicone in some constructions. In other embodiments, the diffusers include ground glass or sandblasted glass. In some constructions the directional element 310 includes other types of diffusers as described in U.S. Pat. No. 6,071,302 by Sinofsky et al. A more detailed description is provided below in relation to FIG. 6.

Figure 4:
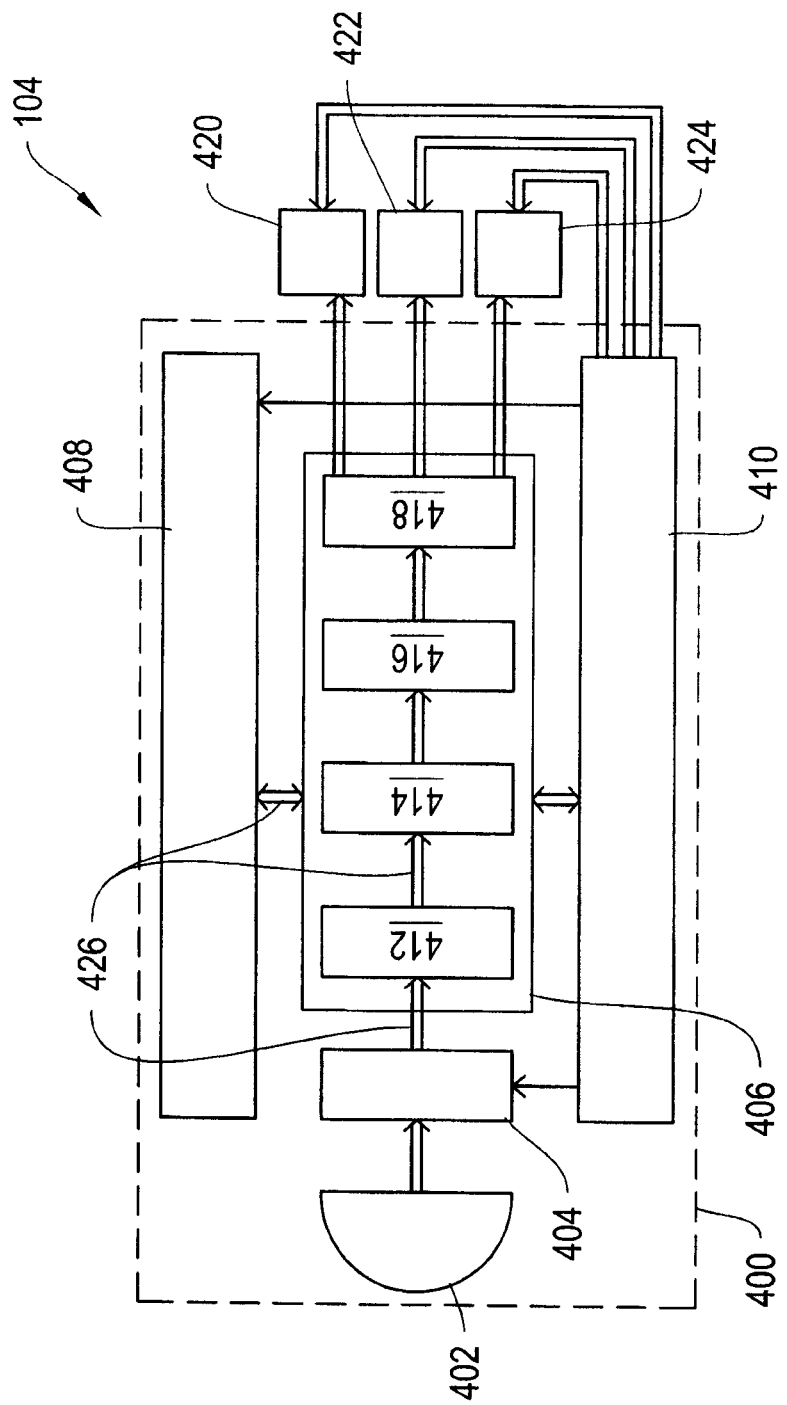
FIG. 4 is a more detailed block diagram of a receiver according to one embodiment of the invention.

FIG. 4 is a more detailed block diagram of a receiver 104 utilized according to one embodiment of the invention having a waterproof enclosure 400 that houses a directional element 402, a detector 404, a microprocessor 406, a memory 408 and a power supply 410. The microprocessor 406 includes a demodulating module 412, a decoding module 414, a protocol/buffer module 416 and a device interface module 418. The receiver 104 is connected to output devices such as a computer 420, a data element 422, or an analog element 424. Components are electrically connected to each other by interconnect buses 426. The description of transmitter 102 and receiver 104 by Farr et al. in U.S. Pat. No. 7,953,326 is expressly incorporated herein by reference for transmitter 102 and receiver 104 for the present invention.

In a number of constructions, the detector 404 receives the transmitted signal from the directional element 402 such that the information in the transmitted signal is processed by electronics in the receiver 104 as well as outside of the receiver 104. As an example, in optical communication where the transmitted signal is the optical wavelength range of the electromagnetic spectrum, the detector 404 is configured to detect the optical transmitted signal and convert the signal to an electrical signal so that the electronics in the microprocessor 406 may process the information in the transmitted signal. In one embodiment, the detector 404 is configured to detect electromagnetic waves in the optical spectrum. In one such embodiment, the detector 404 includes a photomultiplier tube (PMT). In other embodiments the detector 404 may include at least one of a charge coupled device (CCD), a CMOS detector and a photodiode. PMTs typically provide higher sensitivity and lower noise than photodiodes. The spectral response of the bialkali PMTs typically peak in the blue wavelength range with a quantum efficiency of about 20%. Their gain is typically on the order of $10^7$. In certain embodiments, the detector 404 is formed together with the directional element 402. As an example, hemispherical PMTs such as the HAMAMATSU® R5912, as available by February 2006, combine hemispherical directional element 402 with a detector 404. The detector 404 sends the detected signal (typically a value of electrical current corresponding to the intensity of the received electromagnetic radiation) to a demodulating module 416.

In some constructions, in addition to buffering and protocol adjustment capabilities, the protocol/buffer module 416 also includes buffer circuits that are configured to amplify the decoded signal from the decoding module 414. Further, in certain constructions the receiver 104 also includes an Automatic Gain Control (AGC) module that controls the received power of the signal so that the received power is maintained fairly constant for different ranges. In particular, the AGC limits the power of the received signal transmitted over a short distance.

The detector is selected for its compatibility with the emitter, and its ability to detect the signal emitted therefrom. In general, the detector will have the capability of converting received light originating from the emitter to an electrical output. In some cases the detector is a photomultiplier tube ("PMT"), or the like. PMTs are capable of sensing single photon events and their sensitivity can be controlled by changing the voltage used to power the tube. In the most preferred embodiments, the detector is a PMT designed with the largest angular reception possible so that it most preferably is capable of detecting emitted light arriving from at least a hemispherical area.

In some constructions, information processing for the emitter and detector is accomplished through half-duplex multiplexing. The multiplexing frame rate is generally from 1 HZ to 5 Hz often 100-200 Hz, and in some embodiments up to 1000 Hz. In one embodiment, optimal optical performance of the detector is achieved by using light and secondary emitters that are synchronized to the primary emitter both in modulation rate and time division multiplexing.

Figure 5:
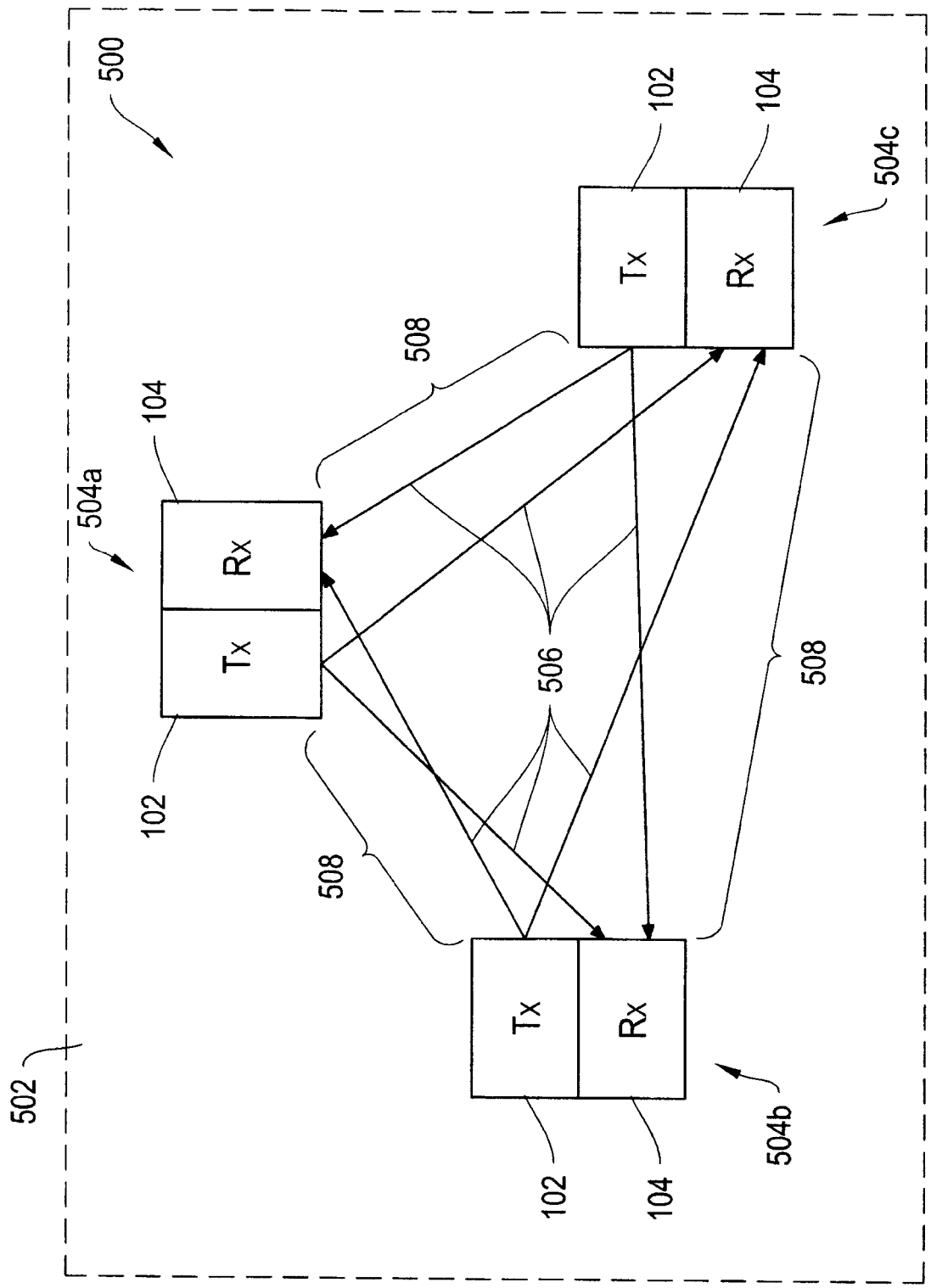
FIG. 5 depicts a network architecture for an underwater communication system according to one embodiment of the invention.

An underwater wireless optical communications network 500, FIG. 5, includes three optical modems 504a-504c; one or more of optical modems 504a-504c may be referred to herein as optical modem 504 or as units 504. In some constructions, each modem 504 has a transmitter 102 and a receiver 104 such that the optical modems 504 can communicate with each other as separate communication nodes within amorphous communication medium 502 as indicated by arrows 506. A distance 508 between the optical modems 504 is typically defined by a range for optical communications in the medium 502 such as suitable distances underwater.

In some constructions, at least one of optical modem 504a, optical modem 504b, and optical modem 504c are mobile, and distances 508 vary according to positioning of those units by one or more users, by currents within medium 502, or by other factors which alter their spatial relationships. In some embodiments, establishing the optical data connection among one or more of units 504a, 504b and 504c includes determining acceptable optical ranges for distances 508 respectively. In some embodiments, an optical communication network 500 is extended by disposing a fourth optical modem within an optical range of modem 504b, and disposing a fifth optical modem within an optical range of modem 504c.

The systems and methods described herein can be utilized to provide a reconfigurable, long-range, optical modem-based underwater communication network. In particular, the network provides a low power, low cost, and easy to deploy underwater optical communication system capable of being operated at long distances. Optical modem-based communication offers high data rate, and can be configured to generate omni-directional spatial communication in the visual spectrum. The omni-directional aspect of communication is advantageous because precise alignment of communication units may not be required. The optical modems may be deployed by unmanned underwater vehicles (UUVs) and physically connected by a tether (e.g., a light-weight fiber optic cable).

In one aspect, the systems and methods described herein provide for an underwater vehicle with optical modem 504a to establish an underwater optical communication link between a first cabled observatory 504b and a second cabled observatory 504c. The underwater vehicle carrying an optical communications system according to the present invention may include two optical modems, mechanically coupled by a tether. Each optical modem may include a transmitter having at least one optical source capable of emitting electromagnetic radiation of wavelength in the optical spectrum between about 300 nm to about 800 nm, and a diffuser capable of diffusing the electromagnetic radiation and disposed in a position surrounding a portion of the at least one source for diffusing the electromagnetic radiation in a plurality of directions. In some embodiments, the tether includes a fiber optic cable, copper cable, or any other suitable type of cable. In some embodiments, each optical modem includes at least two optical sources. A first optical source may be configured to emit electromagnetic radiation at a wavelength different from a second optical source.

The first and second cabled ocean observatories may be submerged under a water body at a desired depth, resting on a sea floor or suspended in the body of water. As referred to herein, the terms "cabled ocean observatory" and "cabled observatory" may be used interchangeably. The cabled ocean observatory may be designed around either a surface buoy or a submarine fiber optic/power cable connecting one or more seafloor nodes. In some embodiments, an underwater observatory maybe a stand-alone unit that is not connected to another communication unit by a tether or a cable. The stand-alone underwater observatory may include an independent power source such as a battery to operate independently. As referred to herein, the term "seafloor node" may refer to an underwater communication unit that includes an optical modem or any other suitable communication device.

The observatory may also include sensors and optical imaging systems to measure and record ocean phenomena such as one or more oceanic parameters. A cabled observatory may be connected to a surface buoy, one or more seafloor nodes by a cable, a surface ship, or a station on land. In some embodiments, the cable includes a tether as described in further detail below. The cabled observatory may include an optical modem. In some embodiments, the optical modem is oriented with a hemispherical diffuser downwards. It should be understood that in some embodiments, the optical modem may be oriented upwards, sideways, or any other suitable direction. To avoid cross-talk among the plurality of modems, different collision avoidance protocols may be used, including TDMA, CDMA, FDMA, SDMA or any other suitable protocol as described above, as well as entraining secondary emissions according to the present invention. In addition, each modem may communicate on a plurality of optical channels, such as a different wavelength of electromagnetic radiation.

Graphs 600, 612 and 616 of FIGS. 6A-6C, respectively, depict the direction of propagation of electromagnetic radiation from a transmitter according to the invention. Graph 600 illustrates the operation of a hemispherical diffuser in one construction of optical modem 504, FIG. 5. The x-axis 602, y-axis 604 and z-axis 606 show directions in a three-dimensional space. The axes 602, 604 and 606 meet at an origin 608. A diffuser 310 is located at the origin 308 and is in communication with a transmitter and oscillator 308, also referred to as a light source 308. The oscillator is a light source used for optical communication in this construction. The direction of propagation of light from the light source 308 after being diffused by the diffuser 310 is shown by arrows 610.

The hemispherical diffuser 310 is positioned such that the flat portion of the hemisphere is located on approximately the plane formed by the x-axis 602 and the y-axis 604 ("x-y plane") such that the flat portion is parallel to the x-y plane and the center of the hemisphere coincides with the origin 608. The light source 308 is located just below the origin 608 and directs light substantially perpendicular to the x-y plane towards the diffuser 310 placed on top of it. The light rays emanating from the light source 308 may strike the flat portion of the diffuser 310 at a perpendicular angle. The diffuser 310 diffuses the light rays in all directions above the x-y plane on the positive side of the z-axis 606. The diffuser 310 and the light source 308 may be arranged in different configurations (such as the arrangement shown in FIG. 10 and described below) without departing from the scope of the invention.

FIG. 6B shows a zoomed-out two-dimensional top view 612 of the diffuser-light source arrangement of FIG. 6A including the formation of wavefronts 614a and 614b as the diffused light propagates through the amorphous communication medium. A wavefront can spatially be described as a surface through which the light waves pass such that the phase of all or substantially all waves at any point on a given surface may be the same. In the illustrated embodiment of the diffuser 310, the diffused light waves describe a hemispherical wavefront. A hemisphere appears as a circle when viewed from above. The circles 614a and 614b represent two wavefronts at different points in time. As the diffused light propagates from the transmitter, at a first time, the wavefront created by light rays is described by circle 614a. At a later time, the wavefront created by the diffused light rays is described by circle 614b. The circle 614b is larger than circle 614a indicting that, over time, light rays propagate over a larger and larger volume of the amorphous medium.

FIG. 6C shows a zoomed-out two-dimensional side view 616 of the diffuser-light source arrangement of FIG. 6A. The wavefronts 614a and 614b are depicted as the diffused light propagates through the positive z-axis 606 volume of the amorphous medium. As seen in FIG. 6B, the circle representing wavefront 614*b* is larger in FIG. 6C than the circle representing later-in-time wavefront 614*a*.

A similar arrangement is duplicated in certain constructions of a receiver where a diffuser is placed on top of a detector such as a PMT to receive light from substantially any direction along a radius of the hemisphere. The benefit of a hemispherical diffuser 310 is that light may be made to propagate in a plurality of different directions.

Figure 7:
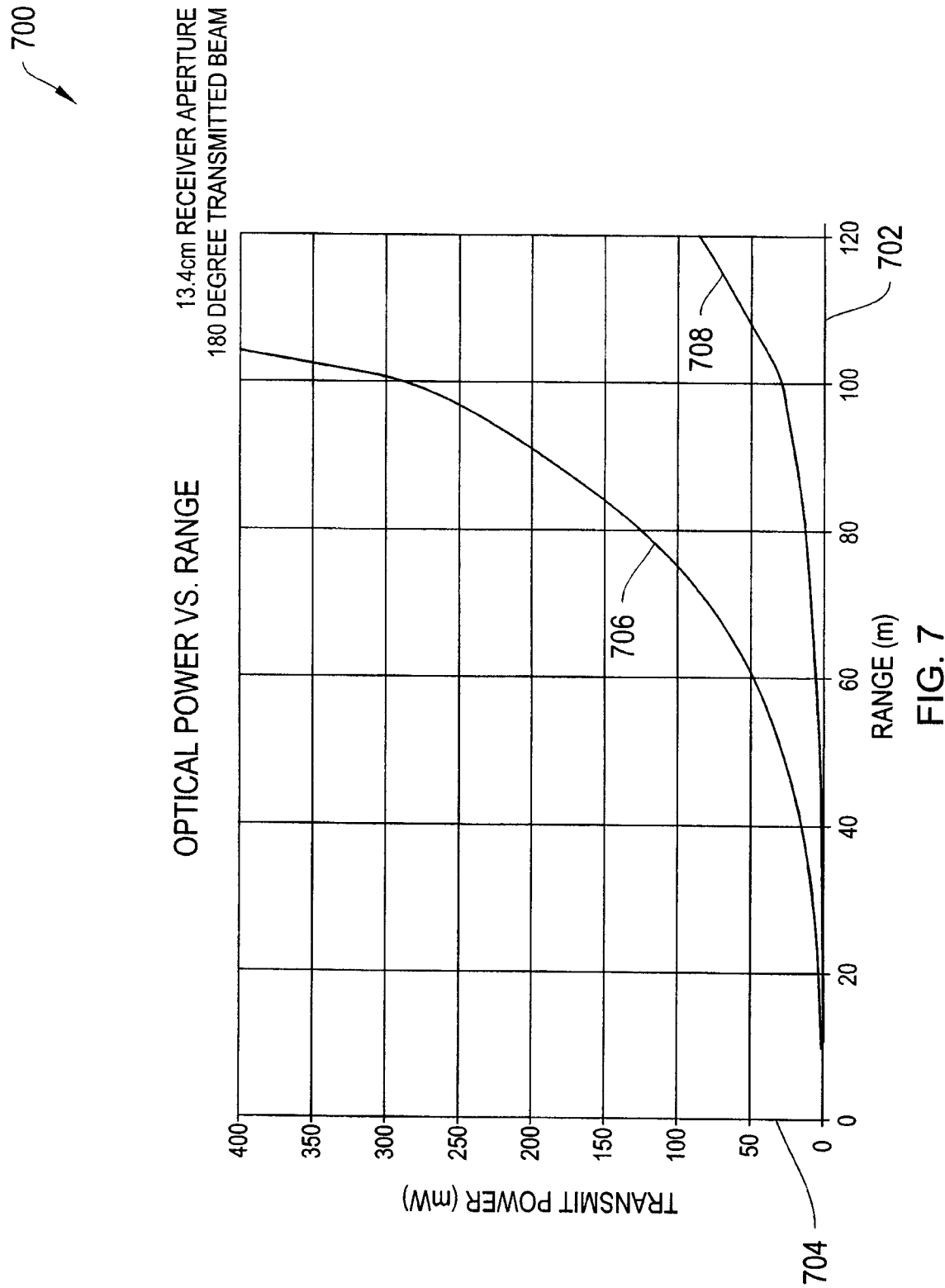
FIG. 7 is a graph depicting the relationship between the average power required to transmit electromagnetic radiation in the optical spectrum and range of transmission.

Graph 700, FIG. 7, depicts the relationship between the average power required to transmit electromagnetic radiation in the optical spectrum and range of transmission for a transmitter with a hemispherical diffuser having diffusing characteristics similar to that shown in FIGS. 6A-6C. The horizontal axis 702 shows the range in meters and the vertical axis 704 shows the optical transmit power in mW. The curve 706 illustrates the average power required for transmission versus range for data rates of about 10 Mbps. The curve 708 illustrates the average power required for transmission versus range for data rates of about 1 Mbps. Curves 706 and 708 show that distance 508, FIG. 5, can be at least 100 meters with data transmission rates of at least 1 Mbps for underwater communication network 500.

Figure 8:
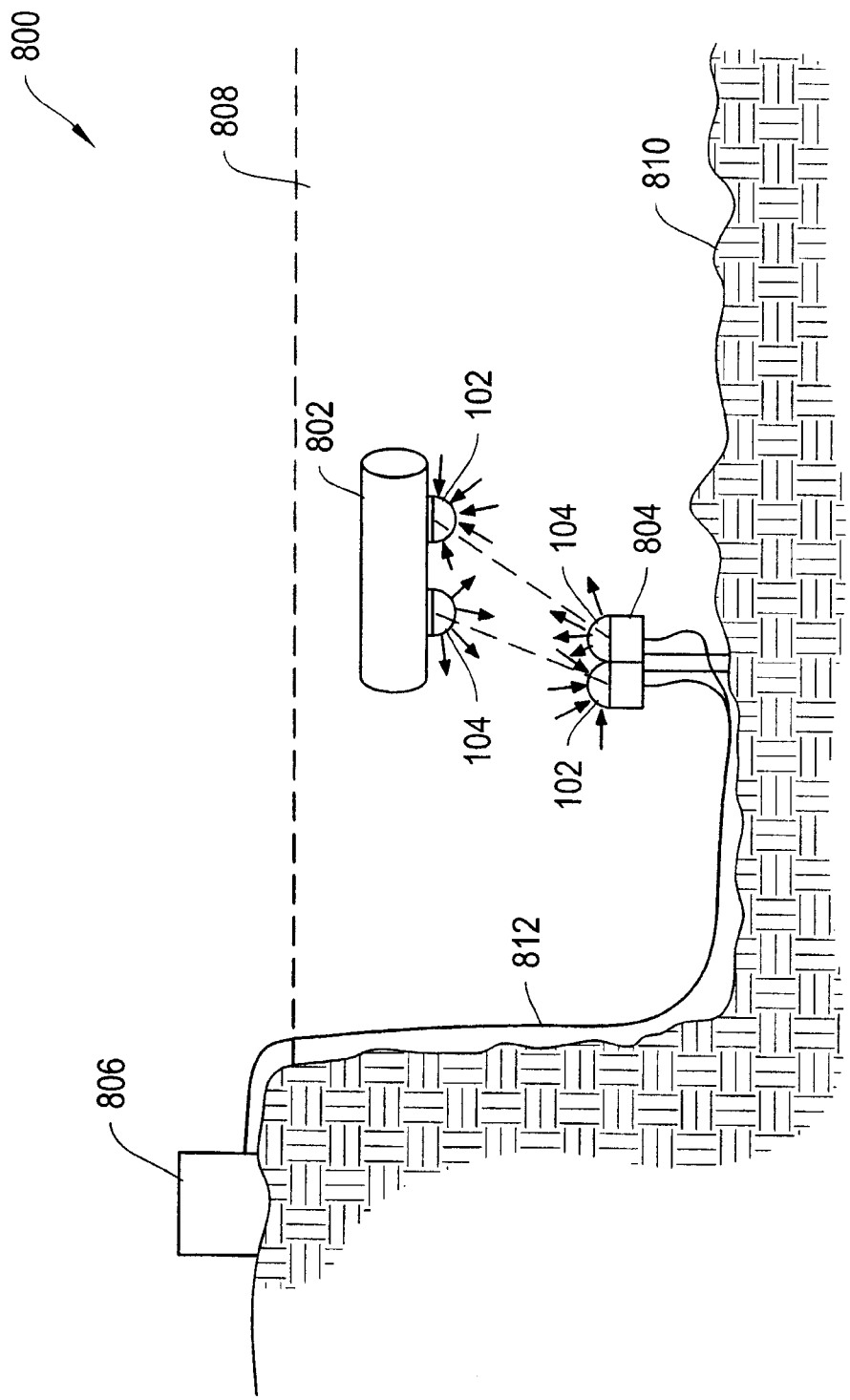
FIG. 8 depicts underwater communication between a seafloor observatory and an unmanned underwater vehicle according to one implementation of the invention.

Underwater communication network 800, FIG. 8, includes an underwater vehicle 802 such as a UUV communicating with a cabled observatory 804 using a communication protocol, e.g., time division multiple access (TDMA), code division multiple axis (CDMA), space division multiple access (SDMA), frequency division multiple access (FDMA) or any other suitable communication protocol between transmitters 102 and receivers 104. Observatory 804 is attached to ocean bed 810 and is connected by cable 812 to a land unit 806 above ocean 808.

Figure 9:
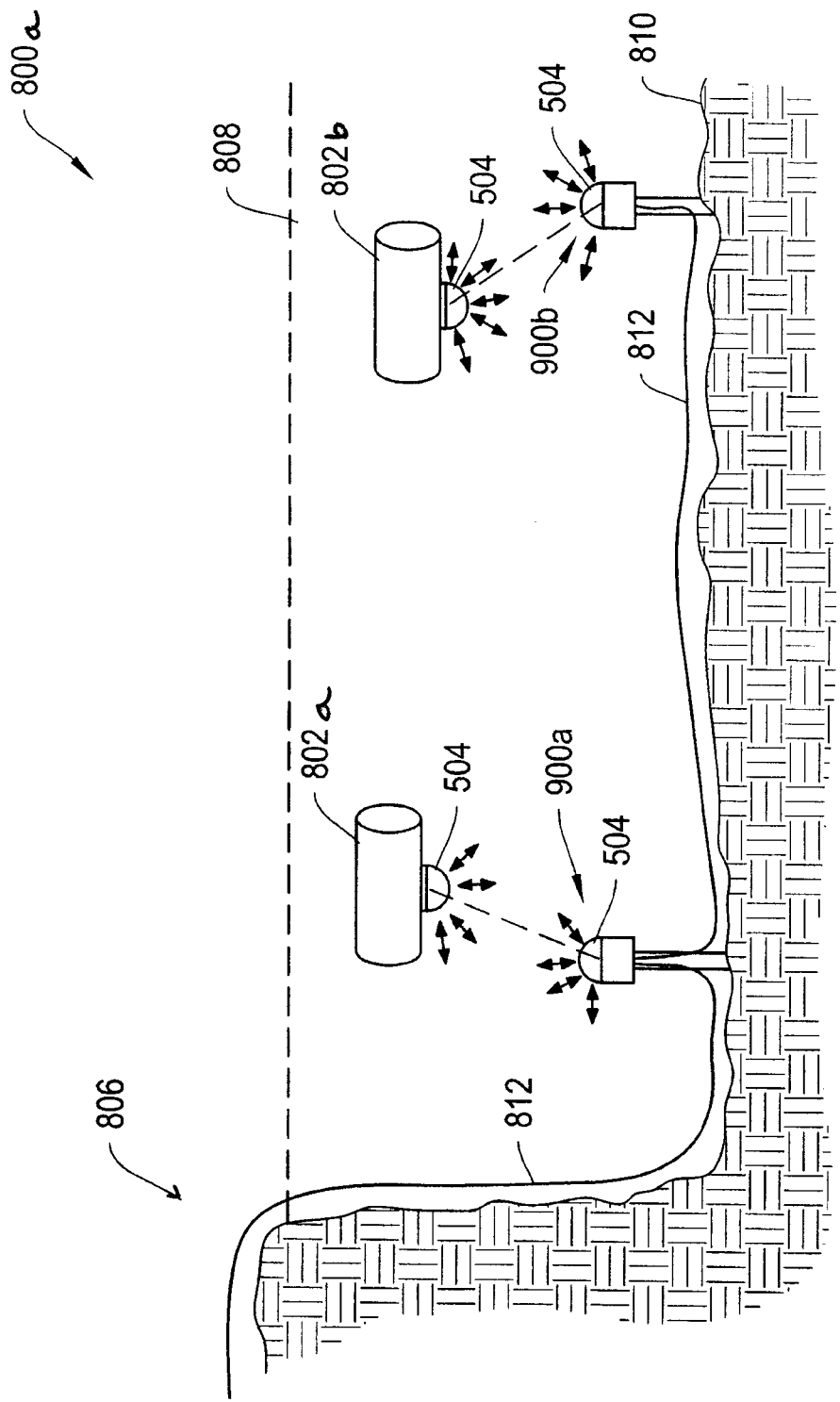
FIG. 9 depicts underwater communication between an unmanned underwater vehicle and two seafloor observatories according to one implementation of the invention.

FIG. 9 depicts an alternative communication network 800*a* with underwater communication between unmanned underwater vehicles 802*a* and 802*b* and two seafloor observatories 900*a* and 900*b* according to one implementation of the invention. Vehicles 802*a*, 802*b* also represent different positions over time for a single underwater vehicle 802. The description of underwater unmanned vehicle 802 and seafloor observatories 804, 900*a* and 900*b* by Fan et al. for FIGS. 8-9 in U.S. Pat. No. 7,953,326 is expressly incorporated herein by reference.

Figure 10:
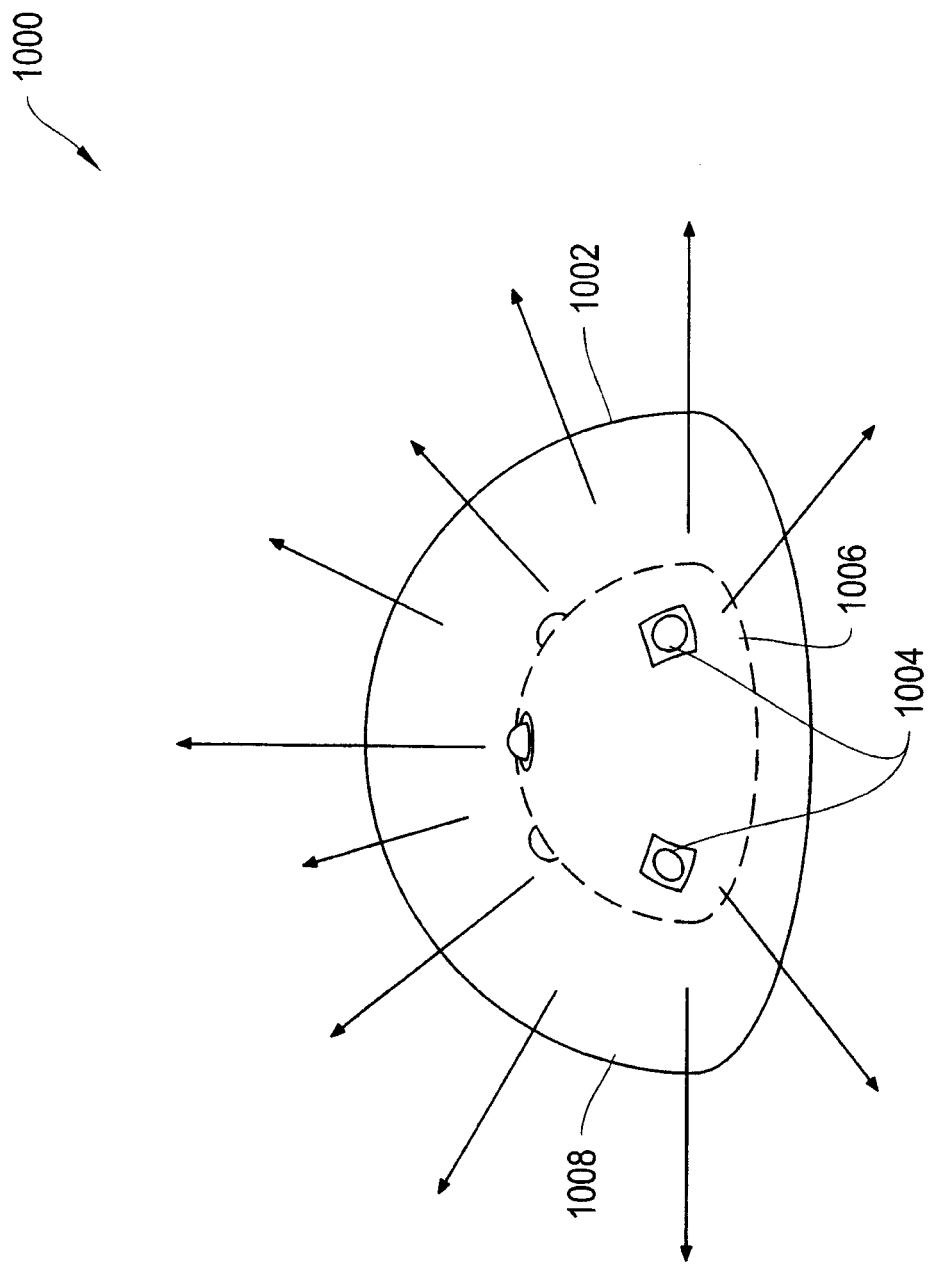
FIG. 10 depicts a transmitter including a plurality of sources and a diffuser according to one illustrative embodiment of the invention.

FIG. 10 depicts a transmitter configuration 1000 including a plurality of sources 1004 disposed within a diffuser 1002 according to another construction of a transmitter according to the invention. Diffuser 1002 is hemispherical with an inner curved surface 1006 and an outer curved surface 1008. The sources 1004 are disposed in the hemispherical diffuser 1002 such that they are protruding from the inner curved surface 1006 towards the outer curved surface 1008. In one embodiment, the sources 1004 include light emitting diodes and the diffuser 1002 includes a lightly scattered $TiO_2$/silicone dome. The diffuser 1002 may also be formed similar to diffuser 310 of FIG. 3 above. The sources 1004 may include sources similar to oscillator 308 of FIG. 3 above. In some constructions, each of sources 1004 is individually controllable such that one or more sources 1004 are used to emit electromagnetic radiation. In certain constructions, the emitted electromagnetic radiation is directed along one or more directions based at least in part on the operation of one or more sources 1004. Power consumption is controlled in some constructions by operating a specific number of sources 1004 as desired to meet certain power consumption or transmission requirements.

Figure 11:
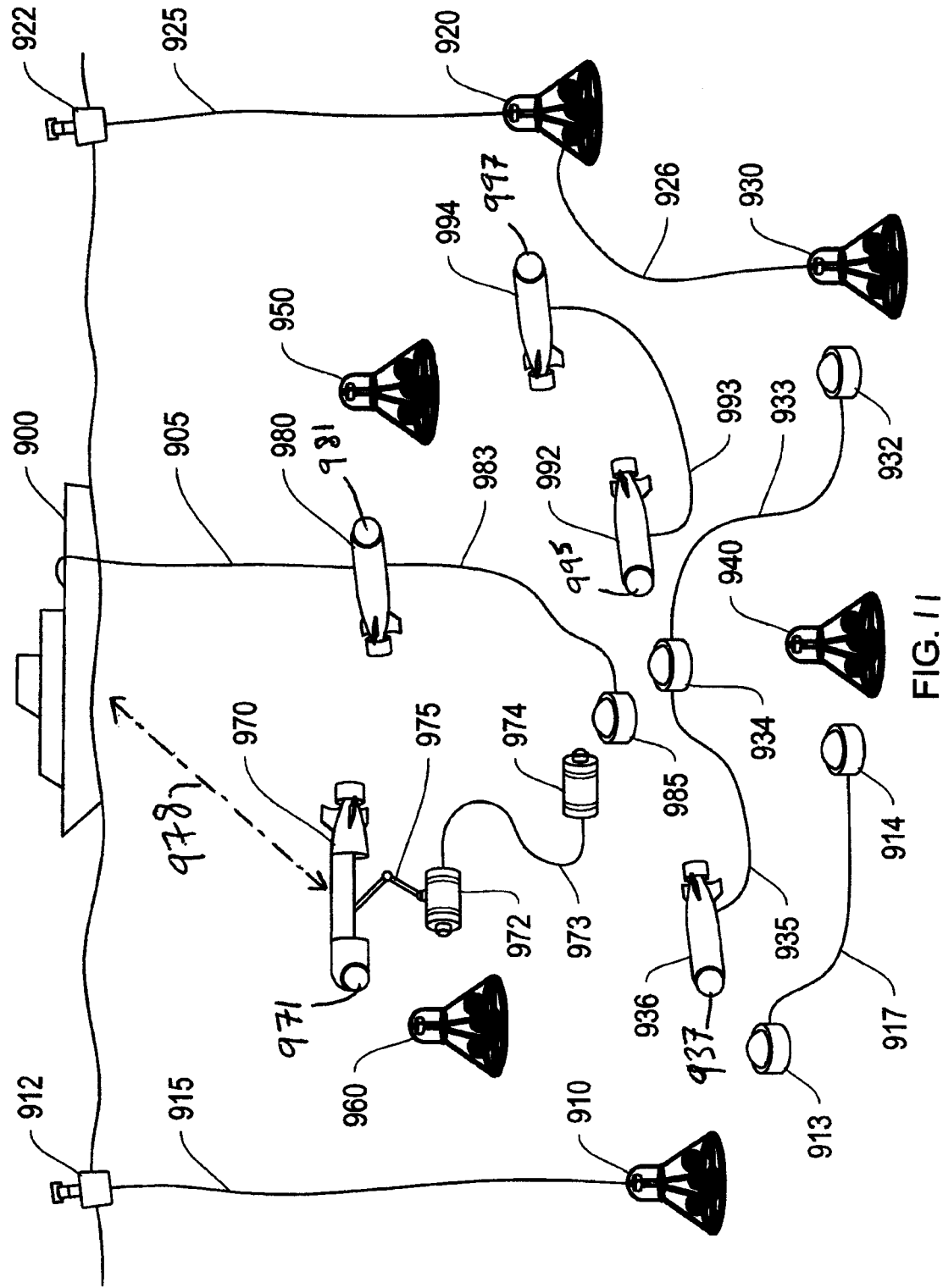
FIG. 11 illustrates an underwater optical communication network including a plurality of underwater optical modems and underwater vehicles according to an embodiment of the invention.

FIG. 11 illustrates an underwater optical communication network including a plurality of underwater optical modems, typically associated with underwater observatories, and underwater vehicles according to an embodiment of the invention. A plurality of underwater observatories 910, 920, 930, 940, 950 and 960, a plurality of stand-alone underwater optical modems 913, 914, 932, 934, 974, and 972, and a plurality of underwater vehicles 936, 970, 980, 992, 994 with secondary emission sources 937, 971, 981, 995 and 997, respectively. Also illustrated are various tethers 917, 933, 935, 973, 983, and 993 that mechanically couple various optical modems. Cables 905, 915, 925, and 926 are illustrated that may connect underwater observatories to one or more surface buoys 912 and 922, underwater observatories to other underwater observatories, or an underwater vehicle to a surface vessel 900. Additional communication techniques can be utilized such as acoustic transmissions 978 between underwater vehicle 970 and surface vessel 900.

Various configurations of underwater observatories and communication networks according to the present invention are depicted in FIG. 11. In a first configuration, a cabled underwater observatory 910 is connected via cable 915 to a surface buoy 912, which resides at the surface of the water. In a second configuration, a cabled underwater observatory 920 is connected via cable 925 to a surface buoy 912, which resides at the surface of the water. Cabled observatory 920 is connected via cable 926 to an underwater observatory 930. In a third embodiment, an underwater observatory may be a stand-alone unit, as illustrated by underwater observatory 940, 950 and 960.

An optical communication network may be established between the plurality of underwater observatories. Stand-alone underwater optical modem 913 may be disposed within an optical range of underwater observatory 910, and stand-alone underwater optical modem 914 may be disposed within an optical range of underwater observatory 940. A tether 917 may mechanically couple underwater optical modem 913 to underwater optical modem 914. Underwater optical modem 913 and underwater optical modem 914 may be deployed using a UUV as described above in reference to FIGS. 8-9.

The network may be extended to include a plurality of nodes. As referred to herein, the term "node" may be defined as an underwater optical modem that is part of an optical communication network. Underwater optical modem 932 may be deployed by a UUV 936 within an optical range of underwater observatory 930. Underwater optical modem 934 may also be deployed by UUV 936 at a location different from underwater optical modem 932 to facilitate connection to other underwater optical communication links. Underwater optical modem 934 may be mechanically coupled to underwater optical modem 932 by tether 933 and to UUV 936 by tether 935. UUV 936 may include an integrated optical modem that enables it to communicate with nodes in the optical communication network. For example, UUV 936 may navigate to a location within an optical range of underwater optical modem 913, and establish a an optical connection with underwater optical modem 913, thereby establishing an optical communication link between underwater observatories 910, 920, 930, and 940.

Faults in the underwater optical communication network may be repaired by reconfiguring nodes in the network. For example, a fault may be detected in tether 926, breaking the optical communication link between underwater observatory 920 and underwater observatory 930. To re-establishing an optical communication link between underwater observatory 920 and underwater observatory 930, optical modems may be deployed at nodes in the network that are connected to the underwater observatory 920 and underwater observatory 930. For example, UUV 994 and UUV 992 may each include an integrated optical modem that may be mechanically coupled to each other by tether 993. UUV 994 may navigate to and establish an optical connection with underwater observatory 920, and UUV 992 may navigate to and establish an optical connection with underwater optical modem 934.

An optical communication link may be formed between underwater observatory 930 and underwater observatory 920 through UUV 992 and UUV 994. In some embodiments, each of UUV 992 and UUV 994 is configured to deploy an optical modem (not shown), that is mechanically coupled by a tether to an integrated optical modem. For example, UUV 992 may be configured to deploy a first optical modem that is mechanically coupled by a tether to an optical modem integrated with UUV 992, which is also mechanically coupled to the integrated optical modem of UUV 994 by a tether 993. In some embodiments, the UUV 994 is configured to deploy a second optical modem that is mechanically coupled by a tether to the integrated optical modem of UUV 994, and also mechanically coupled to the integrated optical modem of UUV 992, and the first optical modem that is deployable from UUV 992.

In some embodiments, optical connections may be formed to stand-alone underwater observatories. For example, UUV 980 may deploy underwater optical modem 985 within an optical range of underwater optical modem 934. UUV 980 may include an integrated optical modem and navigate to stand-alone underwater observatory 950. The integrated optical modem of UUV 980 may be mechanically coupled to underwater observatory 985 by tether 983. UUV may be connected to a surface ship 900 by a cable 905. The cable 905 may enable remote control of underwater vehicle 980.

In some embodiments, optical connections may be formed by deploying a set of stand-alone optical modems. For example, UUV 970 may deploy underwater optical modem 974 within an optical range of 985, and deploy underwater optical modem 972 within an optical range of stand-alone underwater observatory 960. In one construction, underwater optical modem 972 and underwater optical modem 974 are connected by physical tether 973.

As further illustrated in FIG. 11, a plurality of different nodes may connected in a linear or a non-linear arrangement. As referred to herein, the term "linear arrangement" may refer to a series of optical modems that may be connected in a non-branching chain. For example, the series of underwater optical modems 914, 913, 936, 934 and 932 may be considered a linear arrangement. As referred to herein, the term "non-linear" arrangement may refer to an arrangement of optical modems that include branches. For example, the collection of underwater optical modems 972, 974, 980, 985, 934 and 932 may form a branched arrangement that extend from underwater optical modems 934, 974 and 985 as a nexus.

After reviewing the present disclosure, those skilled in the art will know or be able to ascertain using no more than routine experimentation, many equivalents to the embodiments and practices described herein. For example, the illustrative embodiments discuss the use of UUVs, but other underwater vehicles such as remotely operated vehicles (ROVs) and autonomous underwater vehicles (AUVs), as well as submersibles carrying one or more humans, may be used with the systems and methods described herein. Accordingly, it will be understood that the systems and methods described are not to be limited to the embodiments disclosed herein, but is to be understood from the following claims, which are to be interpreted as broadly as allowed under the law.

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

It is the intention, therefore, to be limited only as indicated by the scope of the claims appended hereto. Other embodiments will occur to those skilled in the art and are within the following claims.

What is claimed is:

1. An underwater communication system, comprising:
   at least one input device capable of being in sensory communication with water and capable of generating input signals;
   a transmitter having a source capable of emitting electromagnetic radiation representative of the input signals, and a diffuser having a substantially hemispherical surface, for transmitting the electromagnetic radiation at a rate of at least 1 Mbps along a plurality of radii defined by the surface for diffusing the electromagnetic radiation and disposed in a position surrounding a portion of the source for diffusing the electromagnetic radiation in a plurality of directions; and
   a receiver having a substantially hemispherical surface for receiving the electromagnetic radiation along a plurality of radii defined by the surface and being capable of detecting electromagnetic radiation passing at least 20 m through a high light scattering medium, such that the electromagnetic radiation can be received in substantially any direction;
   wherein the transmitter and the receiver are physically separated from each other; and
   wherein the electromagnetic radiation includes electromagnetic waves of wavelength in the optical spectrum between 300 nm and 800 nm.

2. The system of claim 1 wherein the at least one input device includes a motion sensor.

3. The system of claim 2 wherein the motion sensor detects vibrations transmitted through the water.

4. The system of claim 1 wherein the at least one input device includes a seismic sensor.

5. The system of claim 1 wherein the at least one input device includes an acoustic sensor.

6. The system of claim 1 wherein the transmitter includes a plurality of sources.

7. The system of claim 6 wherein each of the plurality of sources are individually controllable.

8. The system of claim 1 wherein the source includes at least one of a light emitting diode, a laser diode, and a photodiode.

9. An underwater communication system, comprising:
   at least two nodes that can transmit and receive electromagnetic radiation, at least one node including at least one input device capable of generating input signals, each node including:
   a transmitter having a source capable of emitting electromagnetic radiation, and a diffuser having a substantially hemispherical surface, for transmitting the electromagnetic radiation at a rate of at least 1 Mbps along a plurality of radii defined by the surface for diffusing the electromagnetic radiation and disposed in a position surrounding a portion of the source for diffusing the electromagnetic radiation in a plurality of directions; and a receiver having a substantially hemispherical surface for receiving the electromagnetic radiation along a plurality of radii defined by the surface and being capable of detecting electromagnetic radiation passing at least 20 m through a high light scattering medium, such that the electromagnetic radiation can be received in substantially any direction;

wherein the at least two nodes are physically separated from each other, and at least one node includes a transmitter having a source capable of emitting electromagnetic radiation representative of the input signals of the input device; and wherein the electromagnetic radiation includes electromagnetic waves of wavelength in the optical spectrum between 300 nm and 800 nm.

10. The system of claim 9 wherein at least one of the at least two nodes includes a mobile unit.

11. The system of claim 9 wherein at least one of the at least two nodes includes a stationary unit.

\* \* \* \* \*

UNITED STATES PATENT AND TRADEMARK OFFICE
CERTIFICATE OF CORRECTION

| | |
|---|---|
| PATENT NO. | : 9,294,201 B2 |
| APPLICATION NO. | : 14/710456 |
| DATED | : March 22, 2016 |
| INVENTOR(S) | : Norman E. Farr et al. |

It is certified that error appears in the above-identified patent and that said Letters Patent is hereby corrected as shown below:

Specification

In Column 1, before "Background of the Invention" the following should be inserted:

--STATEMENT OF RIGHTS TO INVENTIONS MADE UNDER FEDERALLY SPONSORED RESEARCH
This invention was made with Government support under OCE0428552 awarded by the National Science Foundation. The Government has certain rights in this invention.--

Signed and Sealed this
Third Day of May, 2016

Michelle K. Lee
*Director of the United States Patent and Trademark Office*